United States Patent [19]

Giovanni

[11] Patent Number: 4,545,438

[45] Date of Patent: Oct. 8, 1985

[54] PLOWING IMPLEMENT PROVIDED WITH ROTARY TOOLS

[76] Inventor: Caltabiano Giovanni, via Anfossi n. 4, Padova, Italy

[21] Appl. No.: 569,668

[22] Filed: Jan. 10, 1984

[30] Foreign Application Priority Data

Jan. 28, 1983 [IT] Italy .............................. 41512 A/83

[51] Int. Cl.⁴ ..................... A01B 33/02; A01B 33/10
[52] U.S. Cl. .................................... 172/123; 172/548
[58] Field of Search ............... 172/548, 540, 123, 120

[56] References Cited

U.S. PATENT DOCUMENTS

| 163,061 | 5/1875 | Fenley | 172/123 X |
|---|---|---|---|
| 1,076,745 | 10/1913 | Ciccolini | 172/556 X |
| 1,203,091 | 10/1916 | Autry | 172/548 X |
| 1,232,025 | 7/1917 | Goldschmidt | 172/556 |

FOREIGN PATENT DOCUMENTS

| 1071995 | 12/1959 | Fed. Rep. of Germany | 172/123 |
|---|---|---|---|
| 310777 | 9/1933 | Italy | 172/540 |
| 506339 | 6/1976 | U.S.S.R. | 172/123 |

Primary Examiner—Richard J. Johnson
Attorney, Agent, or Firm—Browdy and Neimark

[57] ABSTRACT

The present invention pertains to a plowing implement provided with rotary tools of the kind comprising a horizontal powered rotor (2) provided with a series of sets (7) of radial tools (9). Each of said tools (9) consists of a substantially irregular, arcuated and pointed wedge-shaped body, having such form that, at its front portion, it exhibits a first face (ABD) remarkably inclined to a vertical plane ($\pi$) and in the form of a moldboard defined forwards by a first cutting edge (AD). At its rear portion, tool (9) exhibits a second cutting edge (BC), slanting with respect to the first one and substantially transverse thereto, which defines a second face (BCD) inclined to the first and contiguous to it.

During the working step, when the tip speed of the tool that rotates concordantly with the equipment advancing direction on the ground, is greater than the advancing direction itself, the first cutting edge (AD) of the tool and the first face (ABD) thereof are operative, so that plowing is carried out by the latter. When the opposite occurs, these conditions being however abnormal and transitory, it is the second cutting edge (BC) and the second face (BCD) that are operative, which allows the equipment advancing and at the same time a sufficient plowing of the ground.

3 Claims, 5 Drawing Figures

PLOWING IMPLEMENT PROVIDED WITH ROTARY TOOLS

FIELD AND BACKGROUND OF THE INVENTION

The present invention relates to a plowing implement provided with rotary tools suitable to be used in operative agricultural machinery for ground working.

It is known that this type of machinery essentially consists of a bearing frame towed by a vehicle on which a powered horizontal rotor forming the machinery operative device is mounted, transversely to the advancing direction thereof, said rotor being provided with a series of radial tool sets.

At present, according to the known art, owing to the conformation of tools used, the operating devices of the known type do not allow a real soil plowing, which is on the contrary obtained by the use of a traditional rectilinear displacement plow. Namely, the implements provided with rotary cutters hitherto employed for this type of working have different drawbacks; among them we must mainly list the smoothing of the furrow bottom on the worked soil length and the difficulty in advancing along the ground, should the advancing speed of the pulling vehicle exceed the rotational tip speed of the tools.

OBJECT

It is therefore a main object of the present invention to obviate the above mentioned drawbacks relative to the hitherto known art, allowing the disposal of an implement provided with rotary tools which permits to carry out the ground plowing with remarkable results if compared with those reached when a traditional plow is used.

SUMMARY OF THE INVENTION

This and still further objects are achieved by the plowing implement of the invention provided with rotary tools consisting of a powered horizontal rotor, mounted on a bearing frame pulled by a vehicle, disposed transversely to the advancing direction of said vehicle and comprising a series of tool sets aligned thereon and suitably spaced apart from each other, each of them being provided with a plurality of curved radial arms at the free ends of which said tools are fixed, characterized in that each of said tools consists of a substantially irregular, arcuate and pointed wedge-shaped body, which prevalently develops along the curvilinear direction of the free end of a corresponding arm and which is of substantially triangular cross-section, said body being forward provided, with respect to its sense of rotation, with a first curvilinear, concave edge acting as the main cutting edge of the tool and lying in a plane inclined by an acute angle α with respect to the vertical lying plane of said arm, said first edge forming the forward rim of at least a first face of said body which is concave and considerably slanting with respect to said vertical plane, has the form of a plowshare-moldboard and is adapted to carry out a sidewise turning over of the earth lump cut by said first edge, said body being further provided, backwards with respect to its sense of rotation, with a second rectilinear edge acting as an auxiliary cutting edge of the tool, which is inclined by an acute angle β with respect to said vertical plane, said second edge forming the back rim of a substantially flat second face of said body that acts as an auxiliary plowshare.

Further features and advantages of the invention will become more apparent from the following detailed description of a preferred embodiment given by way of example only with reference to the accompanying drawings.

BRIEF DESCRIPTION OF THE DRAWINGS

FIG. 6 is a cross section of a tool along the line VI—VI in FIG. 3;

FIG. 7 is an other cross section of a tool along the line VII—VII in FIG. 3.

DESCRIPTION OF THE PREFERRED EMBODIMENT

Figure 1:
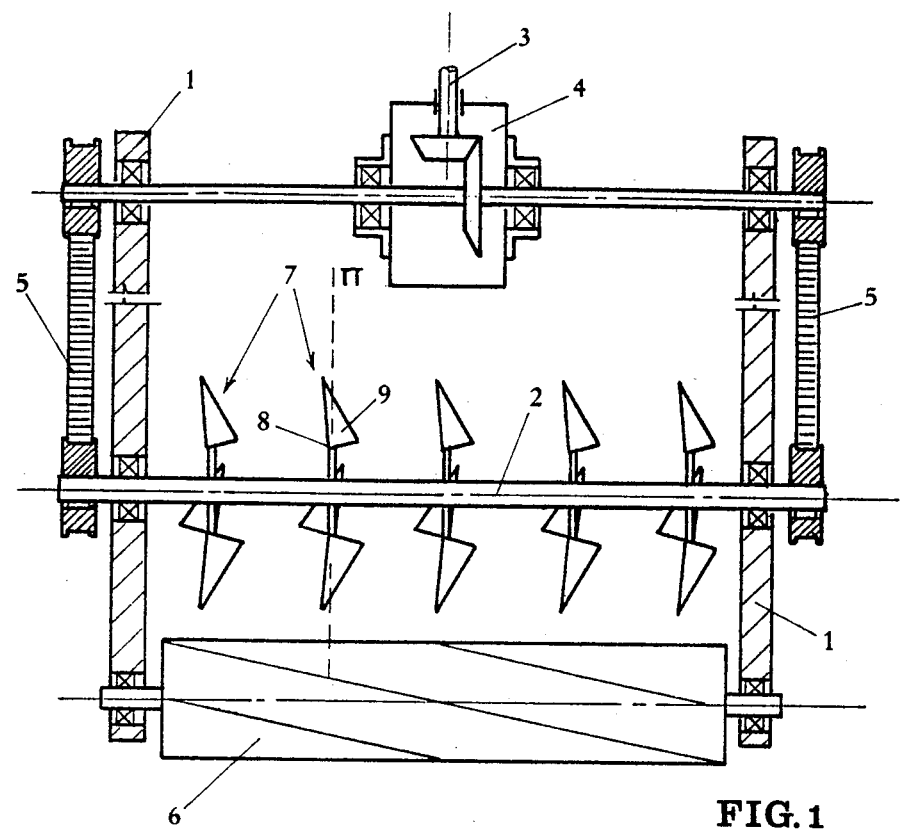
FIG. 1 is a plan diagrammatic view of an operative agricultural machine provided with the plowing implement of the invention.

Referring particularly to FIG. 1, it has been indicated at 1 a bearing frame on which a horizontal rotor 2 is mounted; the rotor is driven, through a Cardian shaft 3, a bevel gear pair 4 and a chain drive 5, by the power take-off of a tractor (not shown). At its back portion, frame 1 is provided, in known manner, with a roller 6 acting as a support member. Rotor 2, that is disposed transversely to the advancing direction, is provided with a series of tool sets 7 suitably spaced apart from each other, each of them being provided with curved, radial plate-shaped arms 8 at the free ends of which tools 9 are fixed.

Figure 2:
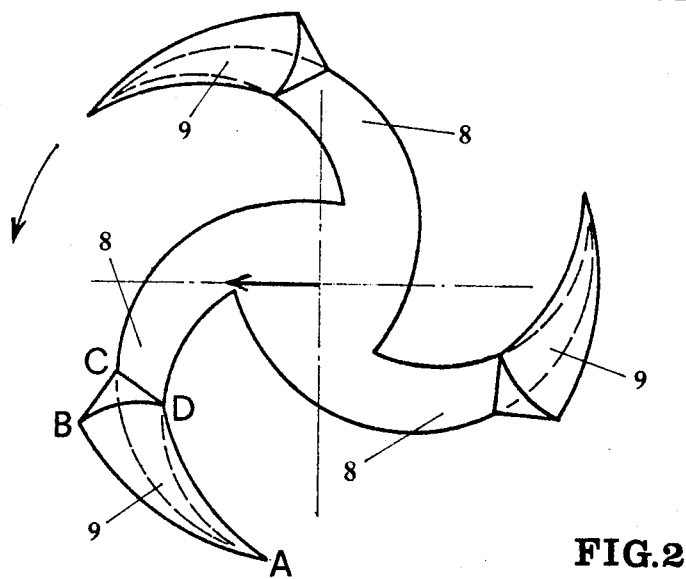
FIG. 2 is a side view of a tool set including three tools suitable to be used according to the invention.

In the embodiment shown in FIG. 2, each set 7 is provided with three arms 8 disposed at 120° and tools 9 are situated on the same side of the rotational vertical plane π of arms 8. In the embodiment shown in FIG. 1 each set 7 is provided with three arms 8 but tools 9 are disposed on both sides (two on one side and one on the other) of plane π. The direction of rotation of each set 7 and the advancing direction of the equipment are indicated by the arrows shown in FIG. 2.

Referring to FIGS. 3–7, each tool consists of an irregular, arcuated and pointed wedge-shaped body (identified for the sake of simplicity by the same reference numeral 9) which prevalently develops along the curvilinear direction of the free end of the corresponding arm 8 and the cross-section of which can be substantially (though incorrectly) defined as triangular.

Body 9 is forward provided, with respect to its sense of rotation, with a first curvilinear, concave edge AD, in reality formed by a narrow elongated surface, acting as the main cutting edge of the tool and lying in a plane π' inclined by an acute angle α ranging between 10° and 15°, with respect to the vertical plane π. This first edge AD forms the front rim of a first concave face ABD that is considerably slanting in a sideways direction with respect to plane π and shaped like a plowshare-moldboard. The first face ABD can be defined as the main plowshare-moldboard of tool 9 being suitable to sidewise turn over the lump of earth cut away by the main cutting edge AD during rotation of set 7 when, under "normal" working conditions, the tip speed of tools 9 is greater than the advancing speed of the equipment.

Figures 3, 4, 5:
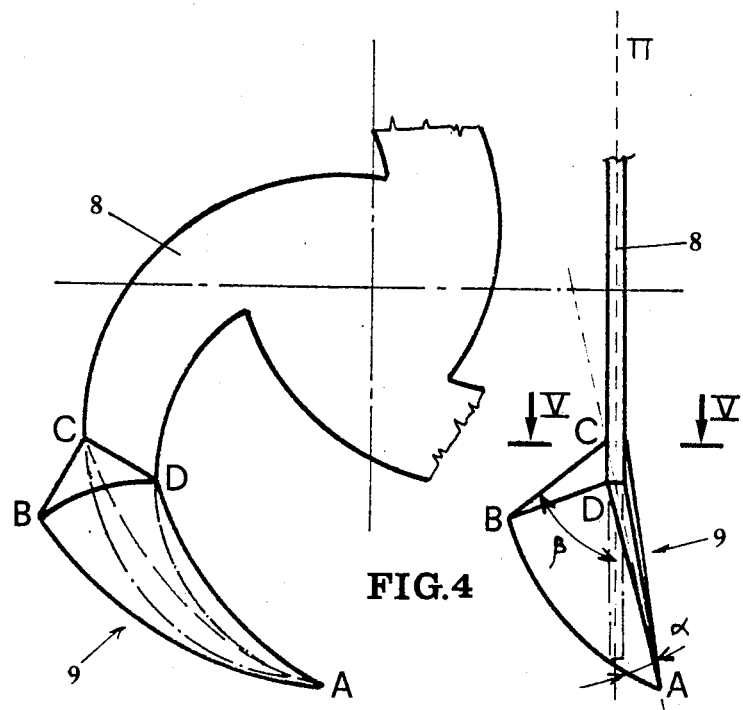
FIG. 3 is a side view of a tool.
FIG. 4 is a front view of a tool and the section of an arm, along the line IV—IV in FIG. 3)
FIG. 5 is a plan view of a tool along the line V—V in FIG. 4.

At its rear portion, body 9 is provided with a substantially rectilinear second edge BC acting as an auxiliary cutting edge of the tool, inclined by an acute angle $\beta$, ranging between 45° and 60° with respect to plane $\pi$ (FIG. 4). This second edge BC forms the rear rim of a second flat face BCD slanting downwards relative to arm 8, as particularly shown in FIG. 4. The second face BCD can be defined as an auxiliary plowshare of tool 9 as it is suitable to work under transitory "abnormal" conditions when the advancing speed of the equipment is, for any reason, greater than the tip speed of tools 9.

Furthermore, the first edge AD forms the front rim of a third face ACD of body 9 which is essentially flat and disposed at the opposite side of the first face with respect to arm 8 and inclined by an angle $\alpha$ relative to the vertical plane $\pi$. The second edge BC, in turn, forms the rear rim of a fourth face ABC the surface of which, adjacent faces ABD and BCD, is part of a cylindrical surface whose generatrixes (parallel to BC) are inclined by an acute angle $\gamma$ in the range of 20°÷25° relative to plane $\pi$ (FIG. 5). It should be pointed out that the bending center of the cylindrical surface of face ABC does not belong to the axis of rotation of set 7. This configuration does therefore avoid the flattening of the furrow bottom by tool 9. All the faces are reciprocally fixed and fixed to the arm 8 by conventional affixing means, such as solderings (not shown).

The faces ABD and ABC are always in touch with the front and back rims of the arm 8 respectively (FIGS. 5-6-7) and are connected to them preferably by solderings, and are preferably reciprocally soldered along the common edge AB.

Face ACD is fixed to the arm 8 preferably by soldering along the edge CD and to the faces ABD and ABC also preferably by soldering along edges AD and AC respectively.

Obviously, various embodiments might be made of the above invention and various changes might be made in the embodiment above set forth, by those skilled in the art, without departing from the spirit and scope of the invention itself.

What is claimed is:

1. A plowing implement provided with rotary tools consisting of a powered horizontal rotor (2), mounted on a bearing frame (1) pulled by a vehicle, disposed transversely to the advancing direction of said vehicle and comprising a series of tool (9) sets (7) aligned thereon and suitably spaced apart from each other, each of them being provided with a plurality of curved radial arms (8) at the free ends of which said tools (9) are fixed, characterized in that each of said tools (9) consists of a substantially irregular, arcuated and pointed wedge-shaped body (9), which prevalently develops along the curvilinear direction of the free end of a corresponding arm (8) and which is of substantially triangular cross-section, said body (9) being forward provided, with respect to its sense of rotation, with a first curvilinear, concave edge (AD) acting as the main cutting edge of the tool and lying in a plane inclined by an acute angle $\alpha$ with respect to the vertical lying plane ($\pi$) of said arm (8), said first edge (AD) forming the forward rim of at least a first face (ABD) of said body (9) which is concave and considerably slanting with respect to said vertical plane ($\pi$), has the form of a plowshare-moldboard and is adapted to carry out a sidewise turning over of the earth lump cut by said first edge (AD), said body (9) being further provided, backwards with respect to its sense of rotation, with a second rectilinear edge (BC) acting as an auxiliary cutting edge of the tool, which is inclined by an acute angle $\beta$ with respect to said vertical plane ($\pi$), said second edge (BC) forming the back rim of a substantially flat second face (BCD) of said body (9) that acts as an auxiliary plowshare.

2. An implement according to claim 1, characterized in that said first edge (AD) constitutes the front rim of a substantially flat third face (ACD) disposed at the opposite side of the first face (ABD) with respect to arm (8) and inclined by an angle $\alpha$ with respect to said vertical plane ($\pi$).

3. A device according to claim 1, characterized in that said second edge (BC) constitutes the rear rim of a fourth face (ABC) the surface of which, adjacent said first and second faces, is part of a cylindrical surface whose generatrixes are inclined by an acute angle $\gamma$ with respect to the vertical plane ($\pi$).

* * * * *

UNITED STATES PATENT AND TRADEMARK OFFICE
CERTIFICATE OF CORRECTION

PATENT NO. : 4,545,438
DATED : October 8, 1985
INVENTOR(S) : Giovanni CALTABIANO It is certified that error appears in the above-identified patent and that said Letters Patent is hereby corrected as shown below:

On the title page item [76] should read:

-- Inventor: Giovanni Caltabiano, via Anfossi n. 4, Padova, Italy --.

Signed and Sealed this

Twenty-fifth Day of February 1986

[SEAL]

Attest:

DONALD J. QUIGG

Attesting Officer

Commissioner of Patents and Trademarks